ELECTRIC PULSE COMMUNICATION SYSTEMS

Filed Aug. 25, 1953 5 Sheets-Sheet 1

Inventor
C. G. TREADWELL
By [signature]
Attorney

Inventor
C. G. TREADWELL
By [signature]
Attorney

Sept. 16, 1958 C. G. TREADWELL 2,852,607

ELECTRIC PULSE COMMUNICATION SYSTEMS

Filed Aug. 25, 1953 5 Sheets-Sheet 3

Inventor
C. G. TREADWELL
By [signature]
Attorney

Sept. 16, 1958 C. G. TREADWELL 2,852,607

ELECTRIC PULSE COMMUNICATION SYSTEMS

Filed Aug. 25, 1953 5 Sheets-Sheet 4

Inventor
C. G. TREADWELL
By [signature]
Attorney

Inventor
C. G. TREADWELL
By [signature]
Attorney 2,852,607

ELECTRIC PULSE COMMUNICATION SYSTEMS

Cyril Gordon Treadwell, London, England, assignor to International Standard Electric Corporation, New York, N. Y., a corporation of Delaware Application August 25, 1953, Serial No. 376,371

Claims priority, application Great Britain September 5, 1952

8 Claims. (Cl. 179—15)

The present invention relates to electric communication systems employing the principle of quantising.

Multichannel pulse time modulation systems of communication have been in use for some years, in which the speech wave or other electrical wave corresponding to each channel is periodically sampled, and the amplitude of each sample is represented by the time deviation of a corresponding pulse from a mean time position.

The signal-to-noise ratio of a system of this kind can be increased by increasing the maximum time deviation of the pulses representing the samples, but this maximum time deviation is limited by the sampling rate, and by the number of channels to be provided. It is well known that the sampling frequency must be at least double the highest frequency of the band occupied by the speech wave, and once this is fixed, the time deviation of the pulses can only be further increased by reducing the number of channels of the system.

The principal object of the invention is to modify the conventional pulse time modulation system for the purpose of increasing the signal-to-noise ratio without the necessity for reducing the sampling rate or the number of channels of the system.

Since experience has shown that the conventional pulse time modulation systems are complicated and expensive, another object of the invention is to simplify and cheapen systems of this kind.

The invention is based upon the combination of two principles which have been suggested at different times for improving communication systems. One of these is the principle of quantisation, which is described, for example, with reference to an electric pulse code modulation system in British patent specification No. 535,860. According to this principle, a sample of the amplitude of an electrical wave at some particular instant is determined with reference to a scale with a limited number of steps, and the amplitude of the nearest step is transmitted. An improvement in the signal-to-noise ratio is then obtained provided that the receiver is designed to recognise only the several amplitude steps of the scale, and this improvement is secured at the cost of some distortion of the electrical wave.

The second principle is that of the use of ambiguous indices to represent a sample of the electrical wave, as explained in British patent specification No. 673,354. According to this principle, an ambiguous index can represent one of several different values of the sample, and by the use of second index representing in a different manner the same sample, which second index may or may not also be ambiguous, the ambiguity is resolved. Use of this principle also gives an improvement in the signal-to-noise ratio without the introduction of quantising distortion.

In an embodiment of the present invention, a quantised version of a sample of the electrical wave is represented by a time modulated pulse which can only assume a limited number (say $n$) of time positions, and the error in the value of the sample as represented by this pulse is determined and transmitted by a second time modulated pulse which can assume any time position within a given range, that is, it is not modulated in steps. The distortion due to quantising is thus substantially compensated, while at the same time, only a fraction of the noise eliminated by the quantising is re-introduced.

It will be appreciated that the second pulse is equivalent to an ambiguous index, since it represents any one of $n$ different values of the sample, and the first pulse is used to determine which of these values is the correct one.

It is to be noted that because the quantising distortion is removed by the second pulse, the number of quantising steps can be quite small (e. g. $n=10$). In cases where the quantising distortion is not eliminated, a much larger number of steps is essential if the wave is to be reproduced with acceptable fidelity. For example, if the wave is a speech wave, there must be probably more than 60 steps for good commercial quality. It will be understood that $n$ could have any desired value besides 10.

The above explanation indicates rather specifically the basis of the invention, which, however, is of broader scope, and is not necessarily embodied in a pulse time modulation system. In its broader aspect, the invention provides a quantised ambiguous index electric communication system, comprising means for sampling an electrical wave at a number of instants spaced in time, and means for transmitting over a communication medium signals which bear two or more indices corresponding to each sample, one of which indices represents the sample ambiguously on a continuous scale, and another of which represents the same sample on a discontinuous scale.

It may be desirable to point out that in the arrangement claimed in specification No. 673,354 already referred to, no quantising is employed, and all the indices represent a given sample of the electrical wave with reference to a continuous scale. A modification of this system described in British patent specification No. 673,360, however, does involve quantising, but in this case all the indices are transmitted in quantised form, so that the electrical wave is subject to quantising distortion which is not eliminated.

It may be useful to point out that while an electrical wave has to be quantised before transmission by pulse code modulation, such a quantised wave may be transmitted in other ways; as already stated above, in one form of the present invention, the quantised wave is transmitted by time modulation of a train of pulses.

In order to illustrate the invention clearly, a particular pulse time modulation system will be described, but it will be understood that the system may be modified to satisfy other requirements. It will be assumed that the system will provide 1 synchronising channel and 31 speech channels, the sampling period being 128 microseconds, which allows a period of 4 microseconds for each channel. Each 4 microsecond period corresponding to a speech channel is divided into two equal half-periods of 2 microseconds duration. During the first half-period there is transmitted a short pulse, called a decade pulse, which can assume any one of ten separate time positions distributed equally throughout the half-period. The time position of the decade pulse then represents the amplitude of the corresponding sample of the speech wave with an error not exceeding 5% of the maximum.

During the second half-period there is transmitted a second short pulse, called a vernier pulse, which can assume any position in the second half-period, and whose time position represents the error in the value of the sample indicated by the decade pulse.

The time displacement error of the decade pulse can have any value within the range of ±0.1 microsecond, and the corresponding displacement of the vernier pulse will cover a range of ±1 microsecond, so that the error value indicated by the vernier pulse is effectively multipled by 10 before transmission. Thus the relative level of the noise accompanying the transmission of the error is effectively reduced by 20 decibels. It can be assumed that the decade pulse will be trimmed at the receiver in order to remove the effects of noise; and accordingly the overall improvement in signal-to-noise ratio will be practically 20 decibels over a conventional pulse time modulation system. Although in the system according to the invention two pulses have to be transmitted in each channel period instead of only one, in the case of the conventional system it is found that in practice half the channel period has to be set aside as a guard interval; while as will be shown later, such a guard interval does not have to be provided in the case of the system of the invention. Thus necessity for accommodating two pulses in each channel period does not in effect reduce appreciably the 20 decibels improvement in signal-to-noise ratio produced by the use of the vernier pulse.

During the second half of the synchronising period, a synchronising pulse, or group of synchronising pulses, distinguishable from the decade and vernier pulses, is transmitted for synchronising the receiver.

The decade pulse and vernier pulse can be regarded as indices representing a sample of the electrical wave, the vernier pulse being an ambiguous, but continuous index, and the decade pulse being an unambiguous, but discontinuous, or quantised, index.

The decade pulse can be regarded as representing the sample of the electrical wave according to a very rudimentary code having only one code element. The sample could evidently be represented more accurately by employing instead of the decade pulse a group of pulses according to a binary code, for example. There would, however, still be an error; and the magnitude of this error could be transmitted by means of the vernier pulse in the manner already briefly explained.

According to a rather more specific aspect, therefore, the invention provides an electric pulse communication system comprising means for periodically sampling an electrical wave, means for transmitting over a communication medium a signal consisting of a pulse or group of pulses representing each sample according to a given code with an error not exceeding a given fraction of the maximum value of the sample, and means for transmitting over the communication medium a further signal corresponding to the same sample, and respresenting the magnitude of the said error on a continuous scale.

The invention further provides a transmitter for an electric pulse communication system comprising means for periodically sampling an electrical wave, means for generating a first short pulse occupying one of a limited number of discrete time positions equally spaced apart during a first time interval, the time position of the said first pulse representing a sample of the electrical wave with an error not exceeding a given fraction of the maximum value of the sample, means for generating a second short pulse during a second time interval, means for modulating the time position of the second pulse in accordance with the magnitude of the said error on a continuous scale, and means for transmitting the first and second pulses over a communication medium.

The invention will be described in detail with reference to the accompanying drawings, in which.

Figure 2:
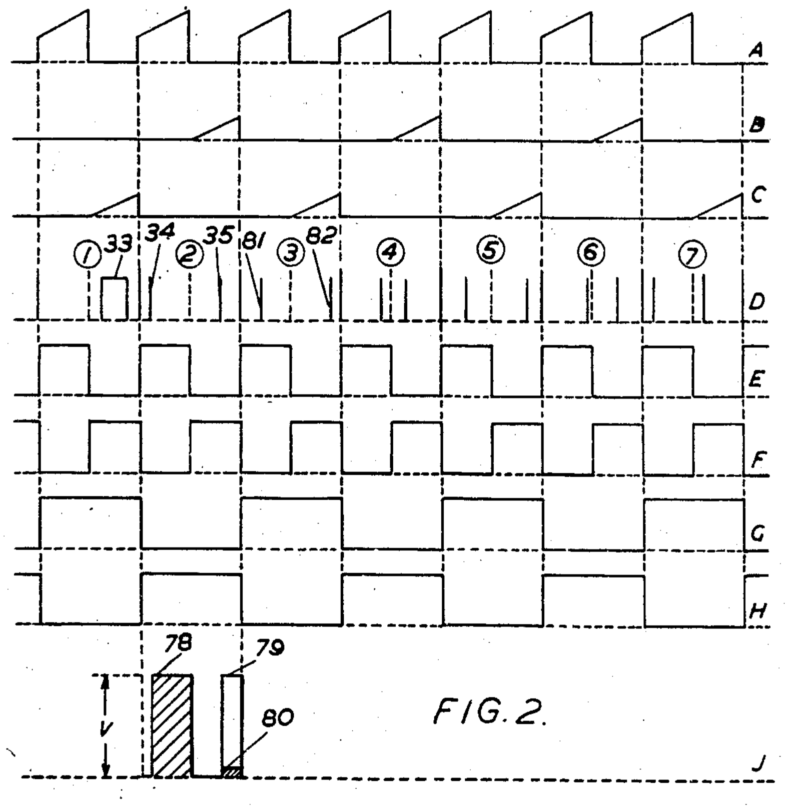
Fig. 2 shows graphical diagrams used to explain the operation of the system.
Figure 7:
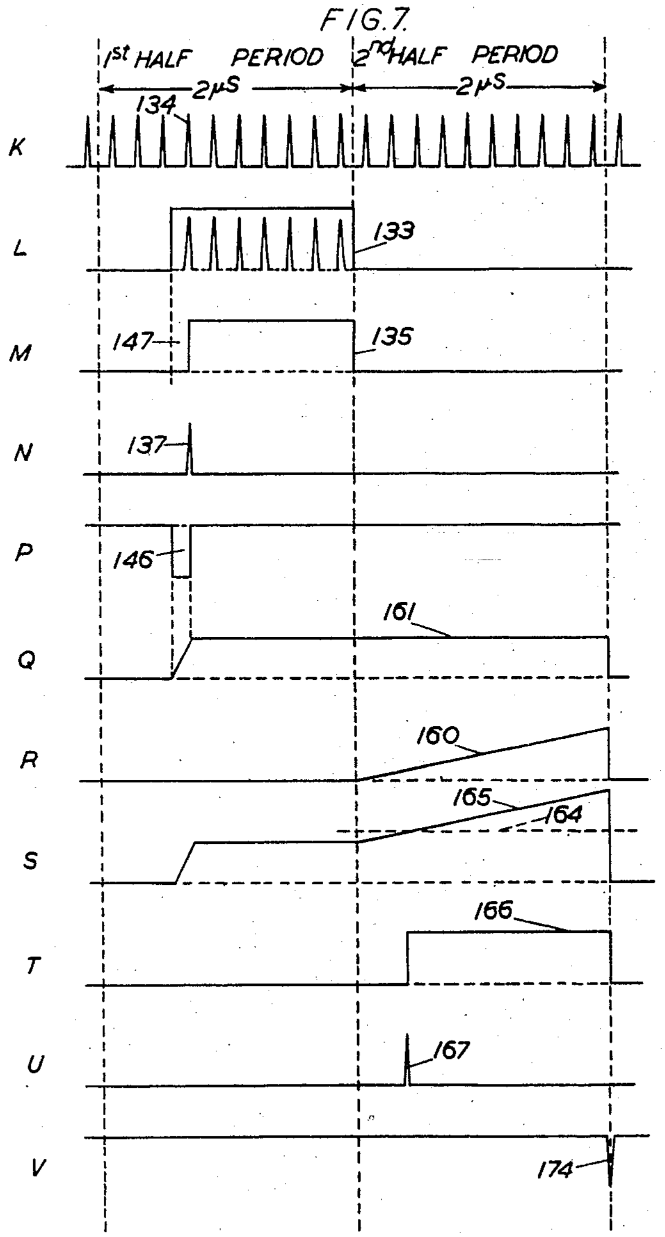
Fig. 7 shows graphical diagrams used to explain the operation of Figs. 5 and 6.

In Figs. 2 and 7 the abscissae represent times and the ordinates represent amplitudes. In each figure the time scale for all the graphs is the same.

Figures 1, 5:
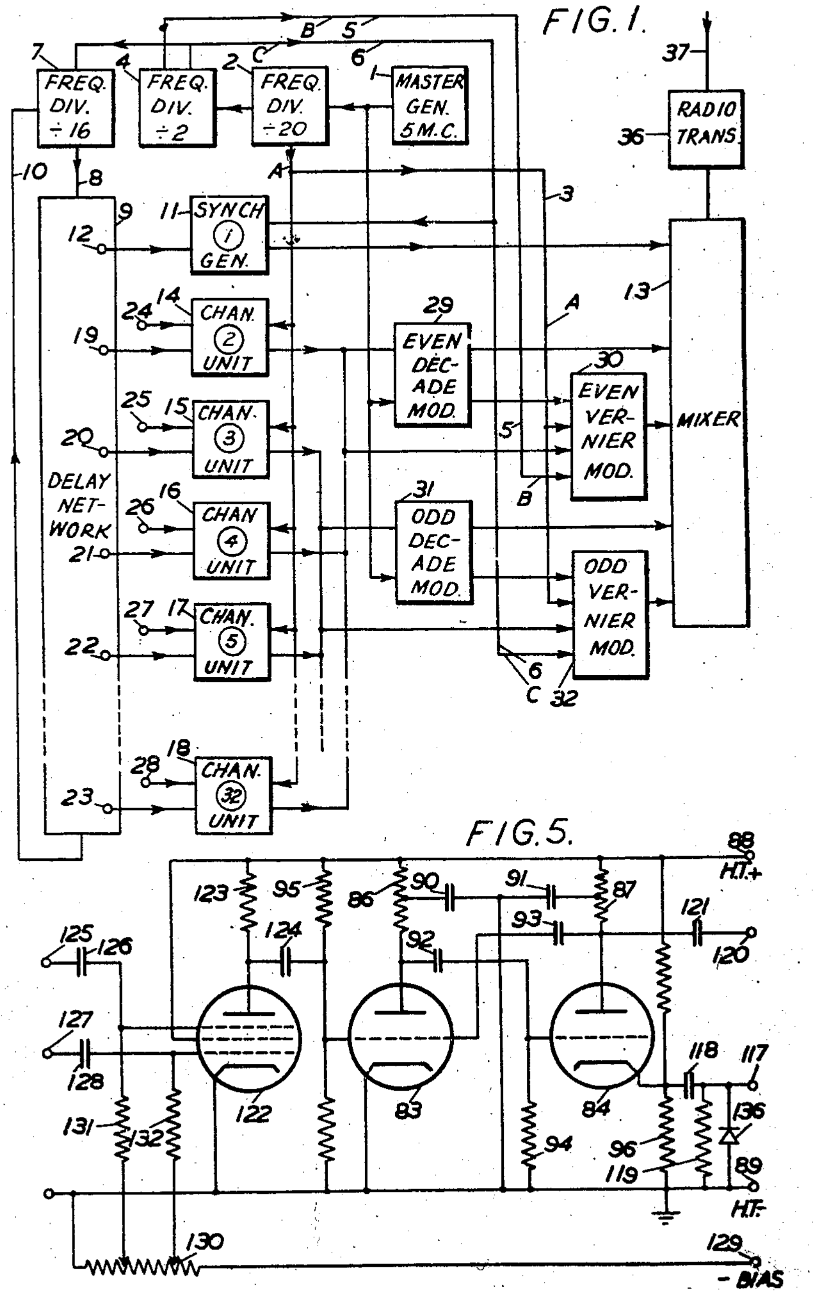
Fig. 1 shows a block schematic circuit diagram of the transmitter of a system according to the invention.
Fig. 5 shows a schematic circuit diagram of one of the decade modulators shown in Fig. 1.

Fig. 1 shows a block schematic circuit diagram of the transmitter of a system according to the invention. The circuit is controlled by a master crystal-controlled generator 1 which generates a train of very short positive pulses regularly repeated at 5 megacycles per second. These pulses are supplied to a frequency divider 2 (which may comprise any convenient number of dividing stages) which divides by 20. This circuit includes shaping means for producing a train of trapezoidal pulses of duration 2 microseconds with a repetition frequency of 250,000 pulses per second. These are shown in graph A, Fig. 2, and define the first halves of the 4 microsecond channel periods which are shown in graph D. These pulses, which will be called the A pulses, are supplied to conductor 3.

The output of the divider 2 is also supplied to a further frequency divider 4, which divides by 2, and includes shaping means for producing two trains of saw-tooth pulses of duration 2 microseconds with a repetition frequency of 125,000 pulses per second.

These pulses are shown respectively in graphs B and C, Fig. 2, and will be called the B and C pulses respectively. They are delivered to conductors 5 and 6, respectively, and the B pulses are phased to occupy the second halves of the even-numbered channel periods, while the C pulses are timed 4 microseconds later than the B pulses, so as to occupy the second halves of the odd-numbered channel periods.

The output of the divider 4 is connected to a further frequency divider 7, having a convenient number of stages, dividing by a total of 16. This divider is provided with pulse shaping means to produce a train of rectangular pulses of 4 microseconds duration with a repetition frequency of 7812.5 pulses per second. These pulses are supplied over conductor 8 to a delay network distributor 9 used for gating the individual channel units. Pulses from the output of the delay network 9 may be fed back over conductor 10 to synchronise the divider 7 if desired. Pulses from the master generator 1 may also, if desired, be supplied directly to the elements 4 and 7 for assisting in synchronising the various dividing stages.

A synchronising pulse generator 11 is provided for producing a distinctive synchronising pulse or signal to be transmitted during the second half of the channel period No. 1 for synchronising the receiver according to conventional practice. The generator 11 is supplied with gating pulses from a tapping point 12 on the delay network 9, corresponding to the first channel period, and also with the trapezoidal C pulses from the conductor 6. By this means the generator 11 is triggered to produce, for example, a synchronising pulse of some distinctive duration, say, 1 microsecond at the centre of the second half-period of the channel period No. 1. The synchronising pulses are applied to a mixing circuit 13.

In addition to the synchronising pulse generator 11, there are provided 31 exactly similar channel pulse generators, called channel units, of which only the first four and the last one are shown, and are designated 14 to 18 respectively. Each is connected to a corresponding tapping point 19 to 23 of the delay network 9 in order that it may be gated into operation during the channel period to which it corresponds. Conductor 3 is also connected to all of the channel units and supplies the trapezoidal A pulses to each of them. The modulating speech waves or other complex electrical waves are supplied to the channel units respectively at the input terminals 24 to 28.

The channel gating arrangements associated with the delay network 9 (and also similar arrangements at the receiver described below with reference to Fig. 3) are based on the circuits disclosed in British patent specification Nos. 587,939 and 635,472.

Figure 4:
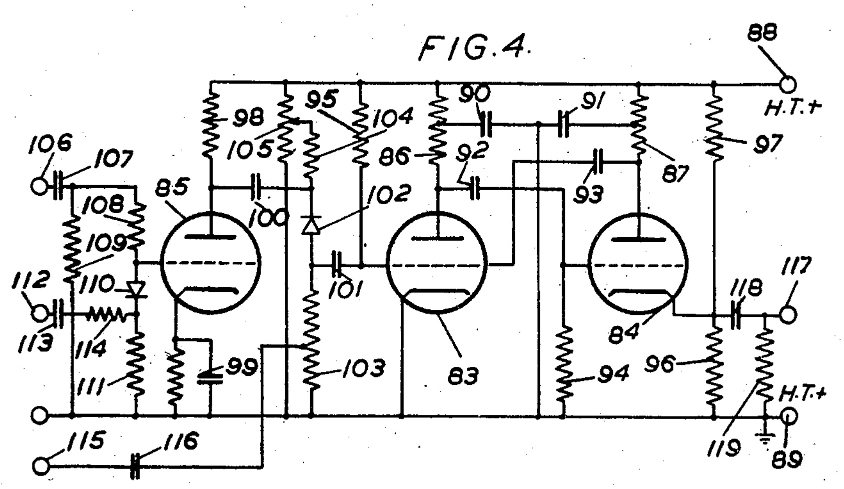
Fig. 4 shows a schematic circuit diagram of one of the channel units shown in Fig. 1.

The circuit of a channel unit is shown in Fig. 4, and is designed to produce in response to the applied speech wave a train of positive duration-modulated rectangular pulses occurring during the first halves of the corresponding channel periods, the time of occurrence of the leading edges of these pulses being modulated with a time excursion of substantially ±1 microsecond.

Figure 6:
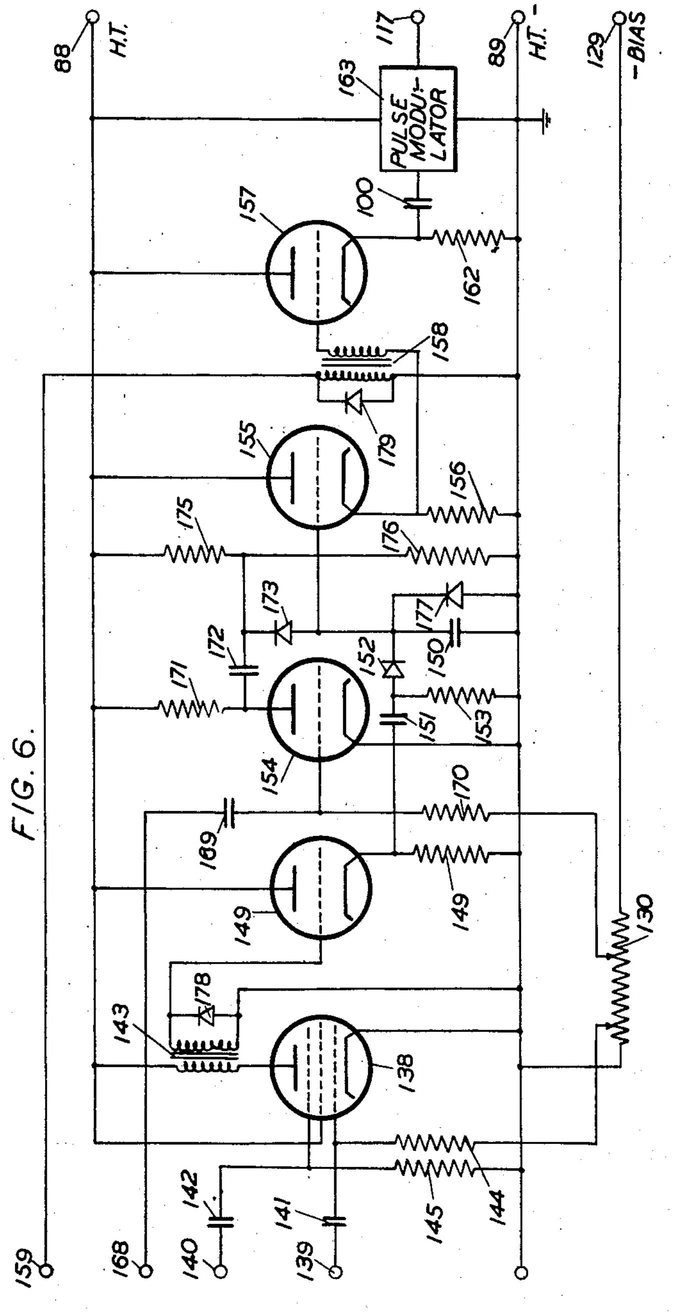
Fig. 6 shows a schematic circuit diagram of one of the vernier modulators shown in Fig. 1.

Corresponding to all the even-numbered channel units there is a decade modulator 29 and a vernier modulator 30, to each of which the outputs of all the said units are connected. Circuit details of elements 29 and 30 are shown in Figs. 5 and 6, respectively. The decade modulator 29 is supplied from the master generator 1 with a train of short pulses spaced apart by 0.2 microsecond. The decade modulator 29 acts as a gating circuit for which the gating pulses are the duration modulated pulses from the even-numbered channel units. Each such duration modulated pulse thus picks out some of the short pulses. A short pulse corresponding to the first of them, and called a "decade pulse" is delivered to the mixer circuit 13 during the first half of the corresponding channel period. The decade pulse represents, by its time position in the first half of the channel period, a corresponding sample of the speech or other electrical wave with an error which may be as much as 5%.

The vernier modulator 30 measures the magnitude of this error in a manner which will be explained later, and modulates in accordance with the magnitude of the error the timing of a short pulse which occurs during the second half of the corresponding channel period, the time excursion of this pulse being substantially ±1 microsecond corresponding to an error of ±0.1 microsecond. This pulse, which indicates the quantising error of the decade pulse, will be called the "vernier pulse." The vernier pulse is also supplied to the mixer circuit 13.

A second similar decade modulator 31 and a second similar vernier modulator 32 are provided for the odd-numbered channel units, and supply corresponding decade and vernier pulses to the mixer circuit 13. It will be evident that the two pairs of modulators operate alternately.

As will be explained with reference to Fig. 6, the vernier modulators require for their operation the A pulses, and accordingly the conductor 3 is connected to both the vernier modulators 30 and 32. In addition, the B pulses are supplied to the even vernier modulator 30 over conductor 5, and the C pulses are supplied to the odd vernier modulator 32 over conductor 6.

Graph D of Fig. 2 shows a few of the 4 microsecond channel periods, each divided into two equal portions by a dotted line. The synchronising pulse 33 is shown occupying the second half of the first or synchronising period, and in each of the other channel periods are shown a pair of short pulses, the pulse such as 34 in the first half of channel period No. 2 being the decade pulse whose time position represents the corresponding sample of the electrical wave of channel No. 2 with an error of ±0.1 microsecond, and the pulse such as 35 in second half period being the vernier pulse whose time position represents the error of the decade pulse.

The pulses combined in the mixer circuit 13 (Fig. 1) are supplied to a radio transmitter 36 of any convenient type in order to modulate a carrier wave, which is radiated by the antenna 37. Alternatively, the pulses could be transmitted over a cable, either directly, or by modulation of a carrier wave.

Figure 3:
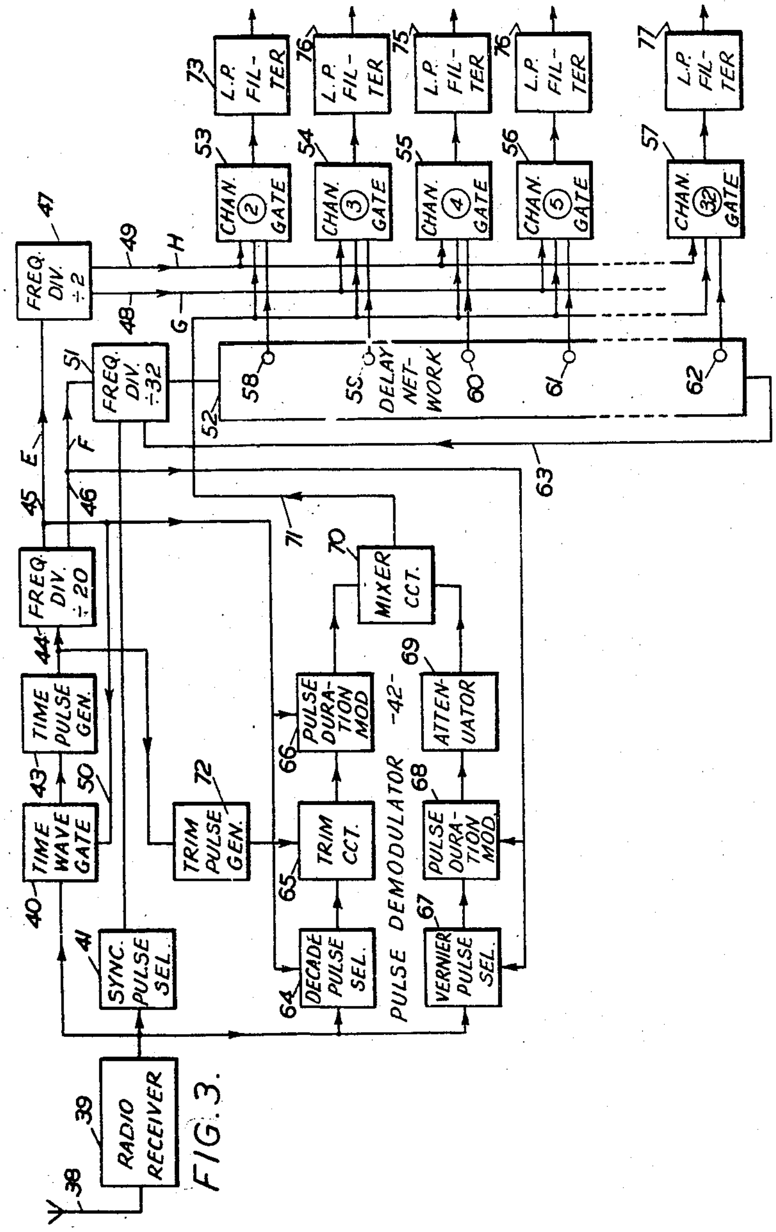
Fig. 3 shows a block schematic circuit diagram of the receiver of the system.

A receiving circuit for demodulating and distributing the pulses transmitted by the circuit of Fig. 1 is shown in Fig. 3. The modulated carrier wave is received by an antenna 38 connected to a conventional radio receiver 39 which includes all the necessary means for recovering the synchronising and channel pulses illustarted in grap D, Fig. 2. These pulses are supplied from the output of the radio receiver 39 to a timing wave gate circuit 40, a synchronising pulse selector 41, and to the two branches of a pulse demodulator 42.

The gate circuit 40 is arranged to be open during the first half of each 4 microsecond period, and closed during the second half in order that it may select the decade pulses and reject all the others. The decade pulses are applied to a timing pulse generator 43, which generates a train of short pulses regularly repeated at 5 million pulses per second in response to the received decade pulses of the respective channels, which pulses are repeated at intervals which are exact multiples of 0.2 microsecond. The generator 43 may, for example, comprise a series of very sharply resonant circuits tuned to 5 megacycles per second, together with any necessary amplifiers. These resonant circuits are caused to ring by the application of the decade pulses, thereby generating a sine-wave of frequency 5 megacycles per second, which is substantially free from the noise which accompanies the received pulses. The waves generated by the resonant circuits are converted by means of differentiating and limiting circuits into a train of short pulses repeated at 5 million pulses per second. These are supplied to a frequency dividing circuit 44 which divides by 20 in any convenient number of stages, and includes shaping and phasing means for producing two separate trains of positive rectangular pulses, each pulse having a duration of 2 microseconds. These two trains, which are supplied respectively of the output conductors 45 and 46, are shown in graphs E and F of Fig. 2, and are phased so as to correspond respectively with the first and second halves of the 4 microsecond channel periods at the receiving end of the system. The two trains of pulses will be called for convenience the E and F pulses respectively. The E pulses are supplied to a further dividing circuit 47 which divides by 2, and includes shaping and phasing means for producing two separate trains of positive rectangular channel timing pulses, each pulse having a duration 4 microseconds. These two trains, which are supplied respectively to the output conductors 48 and 49 are shown in graphs G and H of Fig. 2, and correspond respectively with the odd and even numbered channel periods. These two trains of pulses will be called the G and H pulses respectively.

Since it is necessary for the gate circuit 40 to be open during the first half of each 4 microsecond channel period, the E pulses from the output conductor 45 are applied as gating pulses over conductor 50 to the gate circuit 40 so that it picks out the decade pulse from each channel period. It is for this reason that the synchronising pulses 33 are placed in the second halves of the synchronising periods, so that they will not be picked out with the decade pulses. They are, however, selected by the selector 41, and supplied to synchronise a gating pulse generator 51 which comprises a frequency divider dividing by 32 in a convenient number of stages, to which the output conductor 46 conveying the F pulses is connected. The generator 51 thereby produces gating pulses with a repetition frequency of 7812.5 pulses per second, and includes means for shaping these pulses to a rectangular form with a duration of 4 microseconds.

The gating pulses are supplied to a delay network distributor 52, similar to 9, Fig. 1, which controls 31 channel gating circuits, of which only those corresponding to channels 2 to 5 and 32 are shown, and are designated 53 to 57 respectively.

The synchronising pulses selected by the selector 41 are used to synchronise the dividers in the generator 51 in such a manner that the gating pulses appear at the tapping point 58 to which the gating circuit 53 is connected at the times corresponding to the channel 2 periods at the receiving end. The other tapping points 59 to 62, to which the remaining channel gating circuits are connected, are spaced at intervals of 4 microseconds. Additional synchronisation may be obtained if desired by supplying the pulses from the output end of the delay network 52 to the pulse generator 51 over conductor 63.

The received decade and vernier pulses are respectively dealt with in the upper and lower branches of the pulse demodulator 42. The upper branch comprises a gating circuit 64 for selecting the decade pulses, a trimming circuit 65 for removing the effects of noise and interference from the selected decade pulses, and a duration modulator circuit 66 which produces pulses of given amplitude, the durations of which are modulated in accordance with the time modulation of the corresponding decade pulses.

The lower branch of the demodulator 42 comprises a gating circuit 67, similar to 64, for selecting the vernier pulses, followed by a duration modulator circuit 68 similar to 66 for producing pulses of the same given amplitude, the durations of which are modulated in accordance with the time modulation of the corresponding vernier pulses. The modulator circuit 68 is followed by an attenuator circuit 69 which reduces the amplitude of the duration modulated pulses to one-tenth of its value. The pulses at the outputs of the elements 66 and 69 are combined together in a mixer circuit 70 and supplied to an output conductor 71.

The gating circuits 64 and 67 may, for example, consist of normally blocked valves arranged in any convenient way, to which are respectively supplied the E and F pulses from conductors 45 and 46 as gating pulses. By referring to Fig. 2, it is clear that the gating circuit 64 will be opened during the first half of each 4-microsecond channel period to admit the decade pulses, while the gating circuit 67 will be opened during the second half of each 4-microsecond channel period to admit the vernier pulses. The trimming circuit 65 may, for example, also consist of a blocked valve to which are supplied gating pulses having a duration somewhat less than 0.2 microsecond; for example, these pulses might have a duration of 0.15 microsecond. They are produced by a generator 72 connected to the output of the timing pulse generator 43 which, as has already been explained, produces 5 million pulses per second substantially free from noise. The generator 72 consists principally of shaping circuits for producing pulses of the required duration 0.15 microsecond, and possibly also suitable delay means for adjusting the timing of the pulses so that they may cut off the leading and trailing edges of the decade pulses selected by the gating circuit 64.

The conductor 71 connected to the output of the mixer circuit 70 is connected in common to the input circuits of all the 31 channel gating circuits 53 to 57, which are gated in turn by the gating pulses from the tapping points 58 to 62 of the delay network 52, combined with the timing pulses G and H supplied over conductors 48 and 49 from the frequency divider 47. Each of the 31-channel gating circuits 53 to 57 is connected to a low pass filter having a cut-off frequency slightly above the maximum frequency of the band occupied by the input electrical wave at the transmitter. These low pass filters are designated 73 to 77 respectively, and the corresponding electrical wave will be obtained from the output of each of these filters.

The circuit of Fig. 3 operates in the following manner. At the output of the radio receiver 39 there are obtained during each sampling period of 128 microseconds a synchronising pulse followed by 31 pairs of channel pulses, each pair comprising a decade pulse and a vernier pulse. The synchronising pulse is selected by the selector 41, and the decade pulses are selected by the timing wave gating circuit 40 for producing a 5-megacycle timing wave which controls all the timing arrangements at the receiver. The synchronising pulse controls the phasing of the channel gating pulses so that each of the channel gating circuits opens during the proper channel period. These functions are conventional and do not need further description.

In order to describe the operation of the pulse demodulator 42, channel 2 will be considered. During the first half of the period of channel 2, a decade pulse corresponding to pulse 34 (Fig. 2, graph D) is selected by the selector 64, and after being trimmed by the trimming circuit 65, is applied to the pulse duration modulator 66. This modulator may, for example, consist of a pair of valves forming a conventional multivibrator biased so that it assumes one of its stable conditions. The bias is, however, removed during the first half of the channel period by the application of the E pulse from the output of the divider 44. The trimmed decade pulse is applied to the multivibrator, and owing to the removal of the bias, is able to trigger the multivibrator to the other stable condition. On the disappearance of the E pulse, the bias is re-applied, and the multivibrator is returned to the first stable condition, thereby generating an output pulse 78 (Fig. 2, graph J) whose leading edge coincides with the decade pulse, and whose trailing edge coincides with the trailing edge of the E pulse. Limiting arrangements are provided in the multivibrator circuit so that the pulse 78 has a given amplitude V. It is evident that the duration of the pulse 78 can assume one of only 10 discrete values (since the decade pulse can assume one of only 10 time positions), and represents the corresponding sample of the input electrical wave at the transmitter with an error which may reach 5%. During the second half of channel period 2, a vernier pulse corresponding to the pulse 35 (graph D, Fig. 2) is selected by the vernier pulse selector 67 and is applied to the pulse duration modulator 68, which is precisely similar to the modulator 66, but has supplied to it the F pulses from the output conductor 46 of the divider 44. A pulse 79 of amplitude V is then obtained from the output of the modulator 68; the leading edge of the pulse 79 coincides with the vernier pulse, and the trailing edge coincides with the trailing edge of the F pulse. The duration of the pulse 79 thus represents the quantising error corresponding to the decade pulse.

It was explained above that the equivalent time duration of the pulse 35 (graph D, Fig. 2) is ten times that of the pulse 34. Therefore, in order that the energy content of the pulses 78 and 79 shall respectively represent the quantised sample, and the error, on the same scale, the amplitude of the pulse 79 is reduced to V/10 by the attenuator 69, and then appears as shown shaded at 80 (graph J, Fig. 2).

The pulses 78 and 80 are combined by the mixer circuit 70 and are applied to the channel gating circuits over conductor 71. The gating circuit 53 has been opened by the gating pulse from the tapping 58 of the delay network 52, and so the pulses 78 and 80 will thus be passed through the filter 73.

The combined energy content of the pulses 78 and 80 evidently represents the corresponding sample of the input electrical wave, with the quantising error substantially eliminated. Over a relatively long period of time, the low pass filter 73 has applied to it a series of pairs of duration modulated pulses similar to 78 and 80. The filter effectively integrates the energy contained in the pulses applied to it, with a relatively high time constant, so that it can only recognize variations in energy occurring at frequencies lower that the cut-off frequency. It is clear, therefore, that a replica of the original input wave is obtained from the filter 73 substantially without distortion due to quantising.

The decade and vernier pulses corresponding to the other channels are dealt with in a similar manner by the demodulator 42, and the corresponding pairs of duration modulated pulses obtained at the output of the mixer circuit 70 are directed through the channel gating circuits 54 to 57 to the appropriate low pass filters 74 to 77 in turn.

It may be desirable to explain briefly the operation of the elements 40, 43 and 44 of Fig. 3. The timing wave gating circuit 40 comprises a gating valve which is at first unblocked before any pulses arrive from the receiver 39. At first the gating valve will accept all pulses which arrive, and the timing pulse generator 43 will be excited and some E pulses will be produced at the output of the frequency divider 44. These are supplied to the control grid of the gating valve in the circuit 40 with which is associated a capacitor in which there is built up a bias potential which eventually blocks the valve except during the periods of the E pulses, during which it is opened to accept only the decade pulses which arrive in the first halves of the channel periods. This is a well known arrangement.

The fact that the guard intervals between the periods occupied by the several pulses of the system can be substantially eliminated can be understood from Fig 2, graph D. Consider for example the decade pulse 81 and the vernier pulse 82 of channel 3. If the decade pulse 81 occurs right at the beginning of the channel period 3 and the vernier pulse 35 should happen to occur right at the end of the channel period 2, the timing of the decade pulse 81 might be slightly affected by the presence of the pulse 35, and would bear some crosstalk from channel 2. But this does not matter, since the pulse 81 is trimmed at the receiving end, as already explained. Likewise, if the decade pulse 81 runs very close to the vernier pulse 82, slight distortion would tend to be produced (since both pulses belong to the same channel) but the effect of the distortion is removed by the trimming of the pulse 81 at the receiver.

Now consider the effect on the vernier pulse 35. If this pulse runs close to the pulse 81, the timing of the pulse 35 may be slightly affected, resulting in crosstalk from channel 3, but it is to be remembered that the pulse 35 only represents the error of the decade pulse 34, and the error is effectively attenuated by 20 decibels at the receiver. After the pulse 35 is demodulated at the receiver to produce the pulse 79 (graph J) this pulse is attenuated by 20 decibels to produce the pulse 80 before being added to the pulse 78 derived from the decade pulse 34. The crosstalk picked up by the pulse 35 from the pulse 81 is thus effectively attenuated by 20 decibels.

The pulse 35 will be affected by a close approach of the pulse 34 in just the same way, except that the effect will be slight distortion instead of crosstalk, which distortion is effectively attenuated by 20 decibels at the receiver.

Thus in the system of the invention a close approach of the various pulses can be permitted without appreciable crosstalk or distortion, and large guard intervals such as those used in the conventional systems are no longer necessary.

Fig. 4 shows details of the channel unit 14 of Fig. 1, all the other channel units being similar.

It comprises a conventional multivibrator composed of two cross-connected valves 83, 84 and a gating valve 85 through which the trapezoidal A pulses are passed to the multivibrator. The anodes of the valves 83 and 84 are connected through resistors 86 and 87 to the positive terminal 88 for the high tension source (not shown) the corresponding negative terminal 89 being connected to ground. Intermediate points of resistors 86 and 87 are connected to ground by decoupling capacitors 90 and 91.

The anodes of the valves 83 and 84 are cross-connected to the opposite control grids by capacitors 92 and 93, and the control grid of the valve 84 is connected to ground through a leak resistor 94. The control grid of the valve 83 is connected to terminal 88 through a resistor 95 of large value.

The cathode of the valve 83 is connected directly to ground and that of the valve 84 is biased positively by connection to the junction point of two resistors 96 and 97 connected in series between terminals 88 and 89.

The anode of the gating valve 85 is connected to terminal 88 through a resistor 98, and the cathode is connected to ground through a resistor-capacitor bias network 99. The anode is connected through capacitors 100 and 101 and a rectifier 102 to the control grid of the valve 83. The rectifier is directed to pass negative pulses to this control grid.

The anode of the rectifier 102 is connected to ground through a resistor 103, and the cathode is connected through a resistor 104 to a tapping point in a bias resistor 105 connected between terminals 88 and 89 for applying an adjustable blocking bias to the rectifier.

An input terminal 106 for the gating pulses from the tap 19 of the delay network 9 (Fig. 1) is connected to the control grid of the gating valve 85 through a blocking capacitor 107 and a resistor 108. The junction point of elements 107 and 108 is connected to ground through a leak resistor 109. The control grid of the gating valve 85 is connected to ground through a rectifier 110 and a resistor 111 connected in series. A terminal 112 for the positive trapezoidal A pulses from the frequency divider 2 (Fig. 1) is connected to the junction point of elements 110 and 111 through a blocking capacitor 113 and a resistor 114.

An input terminal 115 for the channel 2 modulating speech wave is connected to a tapping point on the resistor 103 through a blocking capacitor 116. This wave may if necessary be first passed through a conventional amplifier (not shown).

The cathode of the valve 84 is connected to an output terminal 117 through a blocking capacitor 118. Terminal 117 is connected to ground through a load resistor 119.

The resistor 95 should be chosen sufficiently high so that the control grid is normally at about zero potential so that the valve 83 is conducting. The cathode bias of the valve 84 should be such that this valve is cut off. The gating valve 85 is normally blocked, but in a manner to be explained below, passes a single trapezoidal A pulse during the first half of channel period 2. This A pulse will be inverted by the valve 85 and will be applied as a negative pulse to the rectifier 102. At a particular instant during the period of the negative trapezoidal pulse, the negative potential applied to the rectifier 102 overcomes the positive bias and unblocks it, and a pulse is delivered through the capacitor 101 which triggers the multivibrator to the condition in which the valve 83 is blocked and the valve 84 is conducting. The instant at which the rectifier becomes unblocked also depends on the potential of the speech wave applied through capacitor 116.

At the end of the period of the trapezoidal pulse, the trailing edge suddenly blocks the rectifier 102 again, and a positive triggering pulse is delivered through the capacitor 101 to the control grid of the valve 83 which restores the multivibrator to its original condition. A positive rectangular output pulse is thus delivered to the output terminal 117, the leading edge of which occurs at a time depending on the instantaneous voltage of the speech wave, and the trailing edge of which occurs at the end of the first half period of channel period No. 2. The output pulses occurring during successive channel 2 periods are thus duration modulated in accordance with the channel 2 speech wave.

The bias of the rectifier 102 should be adjusted in such manner that when the speech voltage applied at terminal 115 is zero, the multivibrator will be triggered at the centre of the first half period.

The gating of the trapezoidal A pulses operates in the following manner. The rectifier 110 is directed so that the positive trapezoidal pulses applied at terminal 112 tend to block it, so that they cannot raise the potential of the control grid of the valve 85 sufficiently high to unblock it. However if a positive channel gating pulse is applied at terminal 106, it unblocks the rectifier and permits the corresponding trapezoidal pulse to unblock the valve 85. It is to be noted that during the second half of the channel period when no trapezoidal pulse is present, the channel gating pulse cannot unblock the valve by itself because the rectifier 110 will be unblocked and will shunt the gating pulse to ground through the resistor 111.

In order to avoid a large drain on the high tension source, the bias resistors 96 and 97 should be chosen relatively large. In order to provide a convenient output load for the duration modulated pulses, the resistor 119, which is small compared with resistor 96, is connected across the resistor 96 through the blocking capacitor 118. For example, resistor 96 may be ten times the resistor 119.

Fig. 5 shows details of the decade modulator 29 of Fig. 1. The modulator 31 is similar. It comprises a multivibrator including two valves 83, 84 arranged in just the same way as the multivibrator shown in Fig. 4, and will not be described again in detail. In addition, an output terminal 120 is connected to the anode of the valve 84 through a blocking capacitor 121.

A gating valve 122 has its anode connected to terminal 88 through a resistor 123, and to the control grid of the valve 83 through a blocking capacitor 124. The cathode of the valve 122 is connected to ground.

The short positive pulses from the master generator 1 (Fig. 1) are supplied to an input terminal 125 connected to the suppressor grid of the valve 122 through a blocking capacitor 126. The duration modulated pulses from the outputs of all the even-numbered channel units of Fig. 1 are supplied to an input terminal 127 connected to the control grid of the valve 122 through a blocking capacitor 128.

A terminal 129 for a negative bias source (not shown) is connected through a potentiometer resistor 130 to ground, and the suppressor grid and control grid of the valve 122 are connected to respective movable contacts on this potentiometer through leak resistors 131 and 132. These contacts should be adjusted so that the valve is cut off by both grids.

The operation of the decade modulator will be explained with reference to Fig. 7. Graph K shows the two halves of one of the even-numbered channel periods occupied by a train of the short positive pulses from the master generator 1 (Fig. 1) which have a repetition period of 0.2 microsecond, and which are applied to terminal 125 of Fig. 5. Graph L shows a positive pulse 133 produced by the corresponding channel unit which is applied to terminal 127. The leading edge of this pulse occurs at a time determined by the corresponding amplitude of the speech wave. The pulse 133 unblocks the control grid of the valve 122 and allows to pass the last seven of the ten pulses, graph K, which occur during the first half period, and which unblock the suppressor grid in turn. It will be understood that the number of pulses passed by the valve 122 depends on the duration of the pulse 133 which itself depends on the amplitude of the sample of the electrical wave.

The pulse 134, which is the first one of the seven passed by the gating valve 122, after inversion by the valve, triggers the multivibrator over to the condition in which the valve 84 is conducting. The multivibrator will afterwards be insensitive to any of the pulses following the pulse 134, and the time constants of the circuit should be chosen so that it will restore itself within a little over two microseconds after being triggered, so that it will remain insensitive for at least 2 microseconds. The pulse 135 generated at the cathode of the valve 84 is shown in graph M, and its leading edge will generally be slightly later than the leading edge of the pulse 133. The trailing edge of the pulse 135 is not employed in the subsequent operations.

The elements 118 and 119 connected to the cathode of the valve 84 are in this case dimensioned so as to differentiate the pulse 135. A rectifier 136 is connected across the resistor 119 to remove the negative differential pulse corresponding to the trailing edge of the pulse 135. The positive differential pulse shown at 137, graph N, corresponding to the leading edge of the pulse 135, is the decade pulse referred to above, and is delivered to the output terminal 117. The pulse 135 synchronises with the pulse 134, graph K, which is the first of the series picked out by the pulse 133, graph L.

A negative pulse which is the inversion of the pulse 135, graph M is delivered from the anode of the valve 84 to the output terminal 120.

Fig. 6 shows details of the vernier modulator 30 shown in Fig. 1. The pulse 133 (graph L, Fig. 7) from the channel unit Fig. 4 and the inverted pulse 135 (graph M) from the anode of the valve 84 in the decade modulator (Fig. 5) are respectively applied to the control grid and suppressor grid of a pentode gating valve 138. The pulses are respectively applied to the input terminals 139 and 140 which are connected to these grids through blocking capacitors 141 and 142. The anode of the gating valve 138 is connected to the high tension terminal 88 through the primary winding of a transformer 143, and the cathode is connected to ground. A negative bias terminal 129 and bias potentiometer 130 are provided, as in Fig. 5, and the control grid is connected through a leak resistor 144 to a movable contact on the potentiometer so adjusted that the valve is cut off by the control grid. The suppressor grid is connected to ground through a leak resistor 145.

The valve will be unblocked on the control grid by the positive going leading edge of the pulse 133, and will be blocked again on the suppressor grid by the negative-going leading edge of the inverted pulse 135. The anode therefore generates a negative rectangular pulse 146, graph P, Fig. 7 whose duration is equal to the time interval 147 between the leading edges of the pulses 133 and 135. The duration of the pulse 146 thus measures the error in the speech wave amplitude represented by the decade pulse 137. The pulse 146 is inverted by the transformer 143 and is applied in positive sense to the control grid of a cathode follower charging valve 148, the cathode of which is connected to ground through a resistor 149 and to one terminal of a storage capacitor 150 (the other terminal of which is connected to ground) through a large blocking capacitor 151 and a rectifier 152 directed to pass positive pulses to the capacitor 150. The junction point of elements 151 and 152 is connected to ground through a resistor 153.

The valve 148 effectively applies the inverted pulse 146 to charge the capacitor 150 positively, and it will acquire a potential substantially proportional to the duration of the pulse 146 provided that the time constant of the charging circuit is designed to be large compared with the maximum duration of the pulse, which is 0.2 microsecond. Graph Q, Fig. 7 shows the variation of potential of the capacitor 150. When the pulse 146 disappears, the rectifier 152 blocks and the potential of the capacitor thereafter remains constant until the end of the second half period, when the capacitor 150 is discharged by the valve 154 in a manner which will be explained later.

The positive potential acquired by the storage capacitor 150 is applied to the control grid of a cathode follower valve 155, the cathode of which is connected to ground through a resistor 156 and to the control grid of a cathode follower combining valve 157 through the secondary winding of a transformer 158. One end of the primary winding is connected to ground and the other end to an input terminal 159 to which is applied the saw-tooth B pulses (see Fig. 2). One of these pulses occurring during the second half-period is shown at 160 in graph R, Fig. 7. In this way the pulse 161 (graph Q) which corresponds to the voltage variation of the storage capacitor 150 is added to the saw-tooth pulse 160, graph R. The corresponding voltage variation of the control grid of the valve 157 is shown in graph S.

The cathode of the valve 157 is connected to ground through a load resistor 162, and the variation of the cathode potential will be substantially as shown by graph S.

The cathode is connected to a pulse modulator 163 having a circuit substantially the same as that shown in Fig. 5 not including the valve 85 and the elements associated with it. The capacitor 100 is shown in Fig. 6, and it will be understood that the block 163 includes all the elements of Fig. 4 to which the right hand terminal of the capacitor 100 is connected, except 115 and 116 which are not required. The rectifier 102 of Fig. 4 will be biased by adjustment of the potentiometer 105 so that the multivibrator comprising the valves 83 and 84 is triggered when the amplitude of the wave shown in graph S, Fig. 7, reaches the level 164 which would cut the sloping position 165 of the wave at the centre of the second half period, when the duration of the pulse 146 is half the maximum, namely 0.1 microsecond. The cathode of the valve 84 (Fig. 4) then generates a rectangular pulse 166, graph T, the leading edge of which is defined by the time at which the sloping portion 165 cuts the level 164, and the trailing edge of which occurs at the end of the second half period. If the elements 118 and 119 (Fig. 4) are proportioned to differentiate the pulse 166, a short positive vernier pulse 167, graph U, corresponding to the leading edge will be delivered to terminal 117. The negative trailing edge pulse can be eliminated by a rectifier as in Fig. 5.

The conductor 3 (Fig. 1) carrying the A pulses (Fig. 2) is connected to a terminal 168 of Fig. 6 for discharging the storage capacitor 150. Terminal 168 is connected through a blocking capacitor 169 to the control grid of the discharging valve 154 and this grid is also connected through a resistor 170 to a movable contact of the bias potentiometer 130. The anode of the valve 154 is connected through a resistor 171 to the positive high tension terminal 88, and through a capacitor 172 and rectifier 173 to the storage capacitor 150. The valve 154 inverts the A pulse and the elements 170 and 171 should be proportioned to differentiate the inverted pulse, thereby producing short negative and positive pulses corresponding to the leading and trailing edges thereof. The leading edge occurs at the end of the second half of each channel period, that is, at the time when the capacitor 150 must be discharged. The negative differential pulse corresponding to the leading edge is shown at 174, graph V, Fig. 7. This pulse passes through the rectifier 173 and rapidly discharges the capacitor 150. The positive differential pulse corresponding to the trailing edge of the A pulse will be blocked by the rectifier 173 and thus will have no effect.

The rectifier 173 is normally blocked by a small positive potential obtained from a pair of resistors 175, 176, connected in series between terminals 88 and 89. This prevents the storage capacitor 150 from being discharged during the holding period. The discharging pulse 174 must therefore be of sufficient amplitude to overcome this bias.

A rectifier 177 with its anode connected to ground shunts the storage capacitor 150 and prevents it from acquiring a negative potential.

The two rectifiers 178, 179 are respectively shunted across the transformers 143 and 158 to damp out any oscillations which might be excited in these transformers.

In certain of the claims which follow, the modulators 29, 31 of Fig. 1 will be referred to as "decade modulators" for convenience, and the pulses produced by them as "decade pulses," but the word "decade" is not to be understood to restrict the said claims to the case in which the decade pulse can occupy just ten time positions in the first half-period. According to the invention, there could be any number of such time positions.

While the principles of the invention have been described above in connection with specific embodiments, and particular modifications thereof, it is to be clearly understood that this description is made only by way of example and not as a limitation on the scope of the invention.

What I claim is:

1. A transmitter for an electric pulse communication system comprising means for periodically sampling an electrical wave, means for generating a first short pulse occupying one of a limited number of discrete time positions equally spaced apart during a first time interval, the time position of the said first pulse representing a sample of the electrical wave with an error not exceeding a given fraction of the maximum value of the sample, means for generating a second short pulse during a second time interval, means for modulating the time position of the second pulse in accordance with the magnitude of the said error on a continuous scale, and means for transmitting the first and second pulses over a communication medium.

2. A transmitter for a multichannel electric pulse communication system in which the signalling time is divided into a plurality of groups of time periods, each group consisting of a synchronising period followed by a plurality of channel periods, comprising means corresponding to each channel for periodically sampling an electrical wave, means for generating a first short pulse which occupies one of a limited number of discrete time positions equally spaced apart during the first half of the corresponding channel period, the time position of the said first pulse representing a sample of the electrical wave with an error not exceeding a given fraction of the maximum value of the sample, means for generating a second short pulse during the second half of the said corresponding channel period, means for modulating the time position of the second pulse in accordance with the magnitude of the said error on a continuous scale, means for generating a synchronising pulse during the synchronising period, and means for transmitting all the pulses over a communication medium.

3. A transmitter according to claim 1 comprising means for generating during the said first time interval a rectangular pulse whose duration represents the magnitude of the sample on a continuous scale, a decade modulator controlled by the said rectangular pulse for generating the said first short pulse, and a vernier modulator controlled by the said rectangular pulse and by the said decade modulator for generating the said second short pulse.

4. A transmitter according to claim 2 comprising means corresponding to each channel for generating during the first half channel period a rectangular pulse whose duration represents the magnitude of the sample of the corresponding electrical wave on a continuous scale, first and second decade modulators controlled by the rectangular pulses corresponding to even- and odd-numbered channels respectively for generating the said first short pulse for each channel, first and second vernier modulators controlled respectively by the said first and second decade modulators, and by the rectangular pulses correspondingly respectively to even- and odd-numbered channels, for generating the said second short pulse for each channel, the arrangements being such that the first and second vernier modulators respectively operate alternately.

5. A transmitter according to claim 4 in which the trailing edge of the said rectangular pulse coincides with the end of the first time interval or first half channel period, comprising means for generating a train of regularly repeated short master pulses having a repetition period which is an integral fraction of the said first time interval or first half channel period, means for applying the master pulses to the decade modulator, or to each of them, a gating circuit in the decade modulator controlled by a rectangular pulse for selecting a certain number of the master pulses according to the duration of the said rectangular pulse, means in the decade modulator controlled by the first of the selected master pulses for generating a quantised rectangular pulse whose trailing edge coincides with the said first time interval or first half channel period, means in the decade modulator for differentiating the quantised rectangular pulse, and means for selecting the differential pulse corresponding to the leading edge to serve as the said decade pulse.

6. A transmitter according to claim 5 comprising means for applying a train of saw-tooth pulses to the vernier modulator, or to each of them, the saw-tooth pulses occupying the second half channel periods corresponding to the vernier modulator to which the train is applied, means in the vernier modulator controlled by a rectangular pulse and by the corresponding quantised rectangular pulse generated by the corresponding decade modulator for producing a charging pulse whose duration is equal to the difference between the durations of the said rectangular and quantised rectangular pulses, means in the vernier modulator for applying the charging pulse to charge a holding capacitor to a potential proportional to the duration of the charging pulse, a pulse modulator in the vernier modulator controlled by a sawtooth pulse and by the potential acquired by the holding capacitor for generating a vernier pulse whose time position in the second half channel period depends on the said potential, and means in the vernier modulator for discharging the holding capacitor at the end of the second half channel period.

7. An electric pulse communication system comprising a transmitter according to claim 5 and a receiver including means for receiving the decade and vernier pulses, means controlled by the received decade and vernier pulses for reconstituting the corresponding samples of the electrical wave substantially without error, and means for reproducing the electrical wave from the reconstituted samples thereof.

8. A system according to claim 7 in which the receiver comprises means for trimming the received decade pulses in order to remove the effects of noise and interference, means for deriving from each of the trimmed received decade pulses a first output pulse of a first given amplitude, the duration of which first output pulse varies in accordance with the variations of the corresponding decade pulse, means for deriving from each of the received vernier pulses a second output pulse of a second given amplitude less than the first given amplitude, the duration of which second output pulse varies in accordance with the variations of the corresponding vernier pulse, and means for passing all the first and second output pulses corresponding to a given channel through an integrating device for recovering the corresponding electrical wave.

References Cited in the file of this patent

UNITED STATES PATENTS

| | | |
|---|---|---|
| 2,516,587 | Peterson | July 25, 1950 |
| 2,530,538 | Rack | Nov. 21, 1950 |
| 2,551,816 | Staal | May 8, 1951 |
| 2,559,661 | Reeves | July 10, 1951 |
| 2,591,732 | Sheaffer | Apr. 8, 1952 |
| 2,617,879 | Sziklai | Nov. 11, 1952 |
| 2,662,116 | Potier | Dec. 8, 1953 |